(12) United States Patent
Webb et al.

(10) Patent No.: US 6,367,746 B1
(45) Date of Patent: Apr. 9, 2002

(54) GROCERY BAG HOLDER

(76) Inventors: Roger M. Webb, P.O. Box 812, Mount Holly, NC (US) 28120; Gary L. Daniels, Sr., 112 Strathmore Dr., Greenville, SC (US) 29601

( * ) Notice: Subject to any disclaimer, the term of this patent is extended or adjusted under 35 U.S.C. 154(b) by 0 days.

(21) Appl. No.: 09/360,942

(22) Filed: Jul. 26, 1999

Related U.S. Application Data

(60) Provisional application No. 60/095,253, filed on Aug. 4, 1998.

(51) Int. Cl.$^7$ .......................... B65B 67/12; A47G 23/02
(52) U.S. Cl. ........................ 248/95; 248/150; 248/165; 248/97; 294/159
(58) Field of Search .......................... 248/95, 97, 146, 248/150, 165, 459, 460, 166; 294/137, 158, 159; 211/11, 12

(56) References Cited

U.S. PATENT DOCUMENTS

| | | | |
|---|---|---|---|
| 4,226,348 A | 10/1980 | Dottor | |
| 4,364,534 A | 12/1982 | Valesko | |
| 4,540,213 A | 9/1985 | Herlitz et al. | |
| 4,657,295 A | 4/1987 | Holem | |
| 4,674,724 A | * 6/1987 | Gaudet | 248/459 |
| 4,723,743 A | 2/1988 | Jenkins | |
| 4,928,415 A | * 5/1990 | Walters | 40/610 |
| 5,050,825 A | 9/1991 | Bratset | |
| 5,129,612 A | 7/1992 | Beaupre | |
| 5,234,116 A | 8/1993 | Kristinsson et al. | |
| 5,287,971 A | 2/1994 | Dorman | |
| 5,290,002 A | * 3/1994 | Cohen | 248/456 |
| 5,340,183 A | 8/1994 | Horian | |
| 5,366,189 A | 11/1994 | Thompson | |
| 5,427,288 A | 6/1995 | Trubee | |
| 5,464,102 A | 11/1995 | LeBlanc et al. | |
| 5,484,091 A | 1/1996 | Malinowski et al. | |
| 5,535,931 A | 7/1996 | Barlow et al. | |
| 5,601,271 A | 2/1997 | Janowski et al. | |
| 5,641,137 A | * 6/1997 | Collier | 248/95 |
| D398,429 S | 9/1998 | LeBlanc et al. | |
| 5,845,951 A | 12/1998 | Webb | |
| 5,868,294 A | 2/1999 | Webster | |
| 5,927,660 A | * 7/1999 | McNerney | 248/95 |
| 6,089,514 A | * 7/2000 | Huange et al. | 248/95 |

\* cited by examiner

*Primary Examiner*—Anita King
(74) *Attorney, Agent, or Firm*—Dority & Manning, P.A.

(57) ABSTRACT

A bag holder used to stabilize a plurality of grocery and retail bags during transport in a vehicle. The invention has a plurality of hangers. The hangers provide a releasable means to hold the bag handles. The function of the present invention is to hold together the handles of these bags which in turn prevents the contents of the bags from being spilled. The hanger element is designed in an elongated inverted "U" shape with a "lollipop" shaped end. The plurality of hangers form a rack. This rack of hangers is pivotally attached with a hinge to base members which support the apparatus and provide an upright support for the hangers. The base members when spread apart grip the rack and hold it in a vertical manner. A folding tab on one of the base members keeps the base members in the spread open position. In this open position the grocery bag handles are placed over the hangers and held securely in place. When the bags are placed evenly around the apparatus the weight of the bags provide a stable anchorage for the apparatus. The tab is released to collapse the present invention and return it to the non-operational and flat position. When the present invention is closed it has a flat shape and is easy to store. The shape and working parts of the subject are so configured to operate in a manner that meets the objective of the present invention.

14 Claims, 5 Drawing Sheets

GROCERY BAG HOLDER

This Non-Provisional Application is the completion of a Provisional Application No. 60/095253 filed on Aug. 4, 1998.

BACKGROUND OF THE INVENTION

1. Field of the Invention

This invention relates to an apparatus for stabilizing filled grocery or retail bags during transit in a vehicle. Plastic bags with handles and paper bags with handles are used in grocery and retail stores. These bags present a problem when placed in a vehicle trunk, on the seat or bed of a truck that the bags tend to spread open and the contents spill out during transit. The present invention relates to the type of apparatus that stabilizes filled bags during transit and prevents the contents from spilling. The present invention relates to such apparatus that can be closed to a flat shape being suitable for storage when not in use. These bags come in a range of sizes and the subject relates to such apparatus that can effectively be used over a range of various bag sizes. The primary objective of the present invention is to stabilize and prevent a plurality of grocery bags from spilling the contents while being transported.

2. Description of the Related Art

Prior art have been designed to perform the primary function of the subject, however, not in the same manner as the subject. For example, U.S. Pat. No. 5,535,931 issued Jul. 16, 1996 to Barlow et al. is designed as a storage system fitted over the wheel well of a vehicle. Various vehicle cargo organizers are disclosed by Horian in U.S. Pat. No. 5,340,183 issued Aug. 23, 1994; Malinowski et al. in U.S. Pat. No 5,484,091 issued Jan. 16, 1996; Herlitz et al. in U.S. Pat. No. 4,540,213 issued Sep. 10, 1985; and, Janowski et al. in U.S. Pat. No. 5,601,271 issued Feb. 11, 1997. These inventions are intended to be affixed in a permanent or semi-permanent fashion and the operation of these apparatuses are different from the subject. An apparatus to stabilize bags in transit is referenced in U.S. Pat. No. 5,427,288 issued Jun. 27, 1995 to Trubee. This apparatus has retractable hooks on the side to accommodate a plurality of bags. This design is of a rod shaped device resembling a removable shower curtain rod or a toilet paper dispenser. This device requires a clear path between walls of the vehicle and takes up much space in the vehicle.

U.S. Pat. No. 5,287,971 issued Feb. 22, 1994 to Dorman discloses a rack to support grocery bags. This design is cumbersome to set up and takes up much space in the trunk. A trunk contained bag holder U.S. Pat. No. 4,226,348 issued Oct. 7, 1980 to Dottor et. al. likewise takes up a lot of space in the trunk. These devices are different from the subject invention.

Additional prior art include collapsible bag holders provided by Thompson in U.S. Pat. No. 5,366,189 issued Nov. 22, 1994; U.S. Pat. No. 5,129,612 issued Jul. 14, 1992 to Beaupre; LeBlanc et al. in U.S. Pat. No. 5,464,102 issued Nov. 7, 1995; LeBlanc et al. in U.S. Pat. No. Des. 398,429 issued Sep. 15, 1998; Bratset in U.S. Pat. No. 5,050,825 issued Sep. 24, 1991; and, Kristinsson et al. in U.S. Pat. No. 5,234,116 issued Aug. 10, 1993. These apparatuses are similar to the subject in function, but are configured and operate in an overall different manner as compared to the subject.

An apparatus by Webb in U.S. Pat. No. 5,845,951 issued Dec. 8, 1998 is similar to the present invention, but employs a lever device to open and close the unit. The present invention does not contain such lever device. The lever is not necessary to perform the primary function of the invention, but merely provides a convenience to the operator. The prior apparatus by Webb is difficult to perfect and more costly to produce with the lever. The present invention is superior to the prior apparatus by streamlining the unit and reducing the total number of pieces necessary to assemble the present apparatus. The tab on the present invention is used to hold it open and is different from the lever device on the prior art. Therefore, the present invention is superior to this prior art by performing the same basic function and requiring fewer pieces in the assembly.

Inventions U.S. Pat. No. 4,723,743 issued Feb. 9, 1988 to Jenkins and U.S. Pat. No. 4,364,534 issued Dec. 21, 1982 to Valesko are stands for dispensing and filling plastic bags. These devices are used to hold plastic bags and not designed to be used for transport in a vehicle. U.S. Pat. No. 4,657,295 issued Apr. 14, 1987 to Holem is designed to be used to carry grocery bags. A vehicle utility receptacle U.S. Pat. No. 5,868,294 issued to Webster on Feb. 9, 1999 is a container for articles in a vehicle.

These prior art are configured, operate and function in an overall different manner as compared with the subject. The subject provides a new and novel approach to solve the problem of spillage. The functional utility of the prior art are thus limited in comparison to the scope of the subject.

3. Objective of the Subject Invention

The primary objective of the present invention is to stabilize and prevent shopping bags from spilling the contents while being transported in motor vehicles. A secondary objective is to develop such apparatus that can be moved out of the way when not in use. Additional objectives of the present invention include a device which is suitable for use with various size bags and one which allows the bags to be attached in a compact space to be loaded and unloaded with minimal effort. The present invention is an apparatus which is effective, simple to use and provides improved functional utility over the related prior art. An invention meeting these objectives and operating like the subject was not found in a search of the prior art. It is heretofore found there is a present need for the subject invention.

SUMMARY of the INVENTION

The purpose for the invention is to provide a simple to use apparatus which will prevent grocery and retail bags from spilling their contents during transit. The function of the present invention is to hold together the handles of these bags which in turn prevents the contents of the bags from being spilled. The hanger element is designed in an elongated inverted "U" shape and the plurality of hangers form a rack. This rack of hangers is pivotally attached with a hinge to base members which support the apparatus and provide an upright support for the hangers. The base members when spread apart grip the rack and hold it in a vertical manner. A folding tab on one of the base members keeps the base members in the spread open position. In this open position the grocery bag handles are placed over the hangers and held securely in place. When the bags are placed evenly around the apparatus the weight of the bags provide a very stable anchorage for the apparatus. The tab is released to collapse the present invention and return it to the non-operational position. When the present invention is closed it has a flat shape and is easy to store in this configuration. The shape and working parts of the subject are so configured to operate in a manner that meets the objective of the present invention.

BRIEF DESCRIPTION OF THE DRAWINGS

The reference numerals refer to physical parts of the subject invention. Letters are used to reference the sectional views, construction details and operation of the subject invention. The scale varies from Figure to Figure as is necessary to show greater detail. Please refer to attached Drawing Sheets 1, 2 and 3 for the following Figures:

FIG. 5-A is a sectional view of the pivotal area as indicated D—D in FIG. 5.

DETAILED DESCRIPTION OF THE PREFERRED EMBODIMENTS

Figure 1:
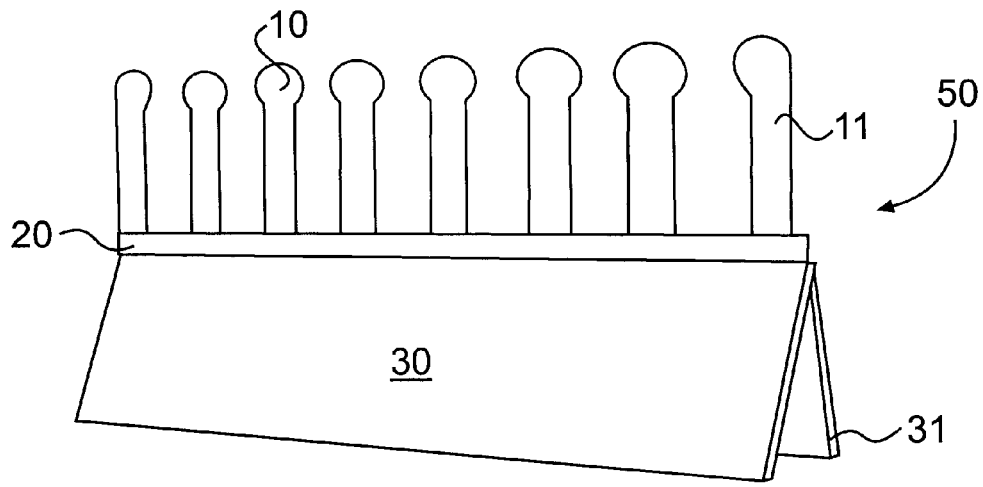
FIG. 1 provides a perspective view of the subject apparatus.
Figure 2:
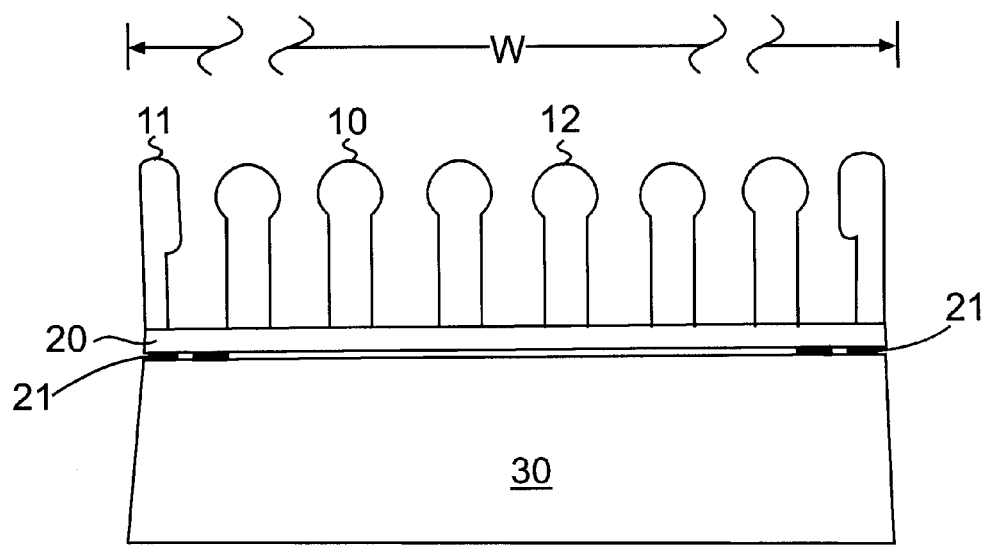
FIG. 2 provides a front side view of the subject apparatus.

Drawing FIGS. 1 through 8 provide disclosure of the preferred embodiments for the subject Bag Holder. FIGS. 1, 2, 3 and 8 show bag hangers 10 and end bag hanger 11 which are used to place the loop handles of grocery bags to prevent spillage. The hangers 10 and 11 have a combination of an elongated inverted U shape with a bulbous and lollipop-like shaped upper end which is designed to secure the bag handles. FIG. 2 shows the area of bending toward the top of the hanger making the lollipop shaped from curve 12. This curve 12 allows the overall length of the hanger 10 to be marginally shorter and still secure the loop handles. A marginally shorter hanger allows the subject apparatus to be used in a compact space. The hangers 10 and 11 allow a releasable means of securing the loop handle bags. As shown in FIG. 2 the width W of the subject may be increased or decreased to accommodate a greater or lesser number of hangers 10 as is a function of the number of bags to be supported.

FIG. 1 shows the subject apparatus 50 comprising the hangers 10, end hangers 11, central body 20, front base leg 30 and rear base leg 31. The base legs open into an inverted V shape and provide support for the central body 20. Hangers 10 and 11 extend up from the central body 20 forming the top section of the apparatus.

Figure 3:
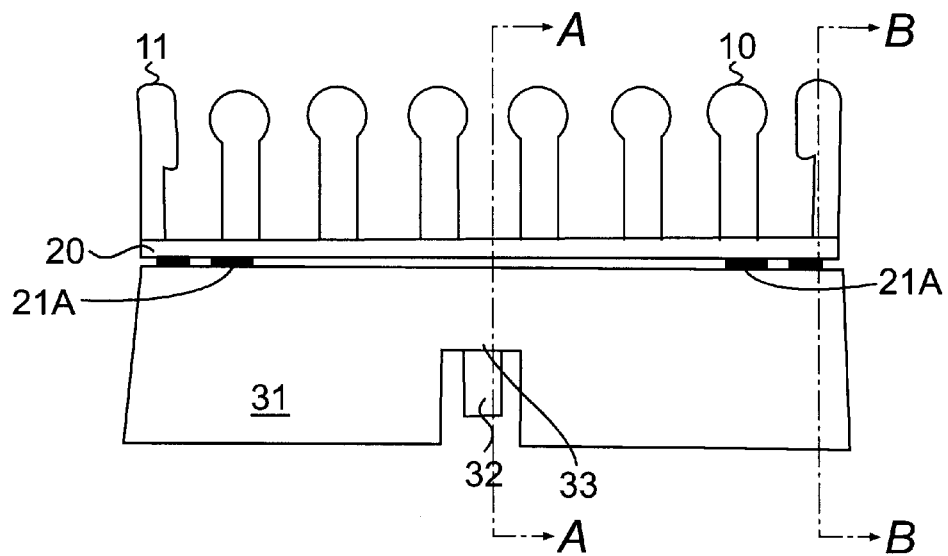
FIG. 3 is a back side view of the subject apparatus.

FIG. 2 shows the front base leg 30 which is pivotally attached with a hinge to the central body 20 by a group of pivotal members 21. FIG. 3 shows the rear base leg 31 being pivotally attached with a hinge to the central body 20 by a group of pivotal members 21A.

Figure 4:
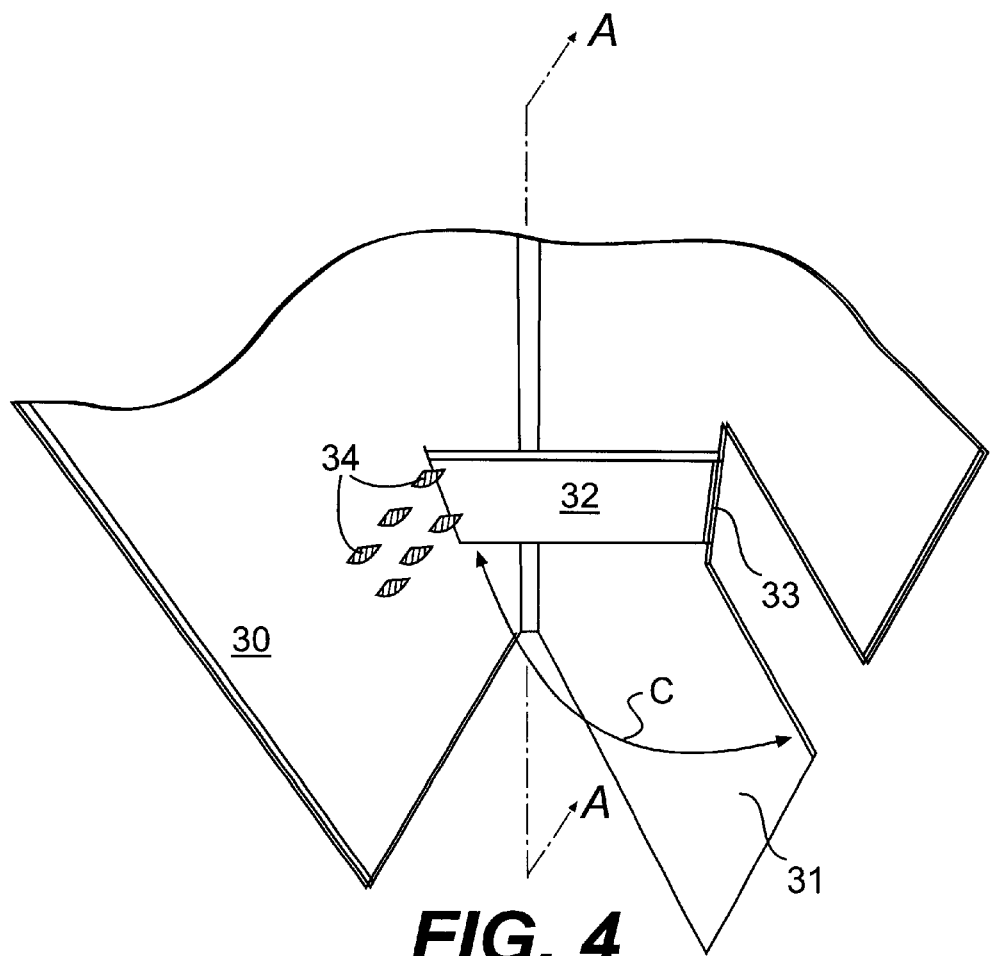
FIG. 4 is a sectional underside perspective view as indicated A—A in FIG. 3.
Figure 7:
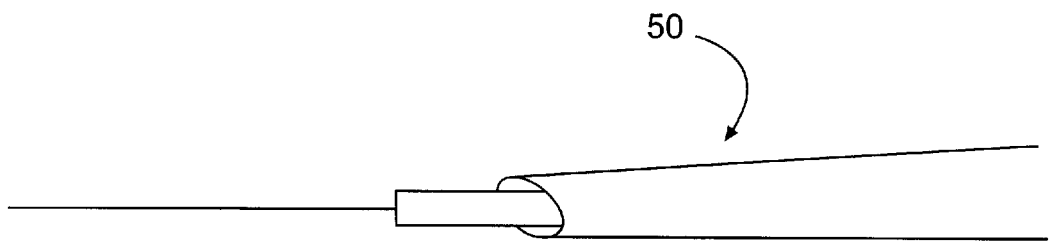
FIG. 7 is an end view of the subject apparatus as closed and laid flat for storage.

FIG. 3 has an opening support member tab 32 which is hinged on pivotal member 33 allowing it to move up and hold open the base legs 30 and 31 into the open inverted V position. FIG. 4 shows the sectional view A—A indicated on FIG. 3. This is a close up perspective view from the underside of the subject apparatus and intended to show the function and operation of the opening support member tab 32. As shown in FIG. 4 the opening support member tab 32 moves along the action arrow C and snaps into place along securing standoffs 34 located in the interior area of front base leg 30. Securing standoffs 34 are placed in a parallel fashion and at different elevations allowing the spread between the base legs 30 and 31 to fully open. The resulting compression between the legs holds the subject open. To close the apparatus the base legs are pushed apart enough to allow the opening support member tab 32 to be released from the securing standoff 34. The opening support member tab 32 can now be rotated along pivotal member 33 and returned to a parallel position in the same plane as rear base leg 31. The subject base legs 30 and 31 can then be closed together and the subject stored in a flat configuration as indicated in FIG. 7.

Figure 6:
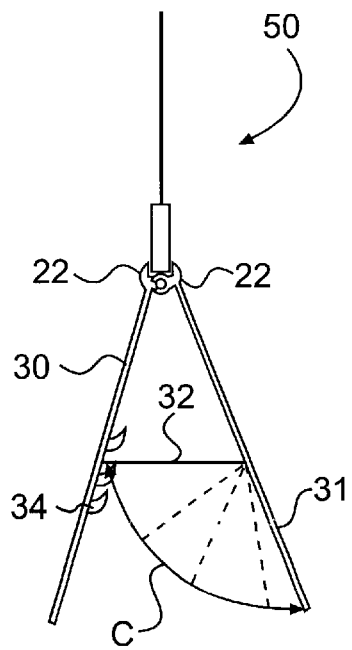
FIG. 6 is an end view of the subject apparatus as opened.

This operation is also depicted in FIG. 6 showing the subject apparatus 50 as an end view stick figure with opening support member tab 32 moving along curve C and being held in place by securing members 34. As shown, the opening support member tab 32 can thus be pivoted about a horizontal axis defined by the central body 20 (See FIG. 1). For example, when the tab 32 is pivoted to the position shown in FIG. 6, the base legs 30 and 31 and be kept apart so that the subject apparatus remains open.

Figure 5:
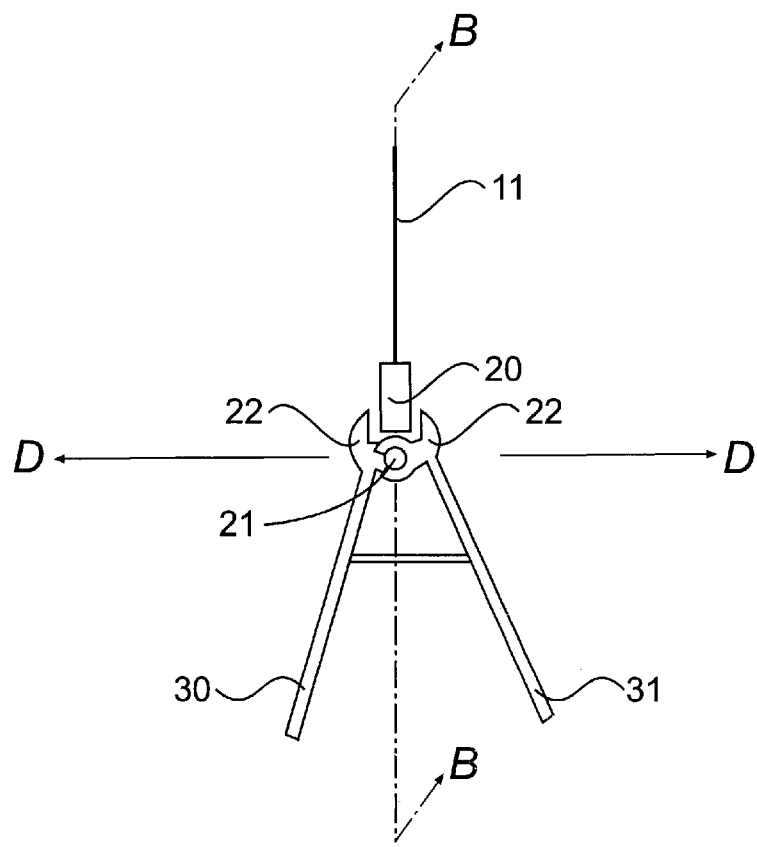
FIG. 5 is a sectional end view as indicated B—B in FIG. 3.
Figure 5A:
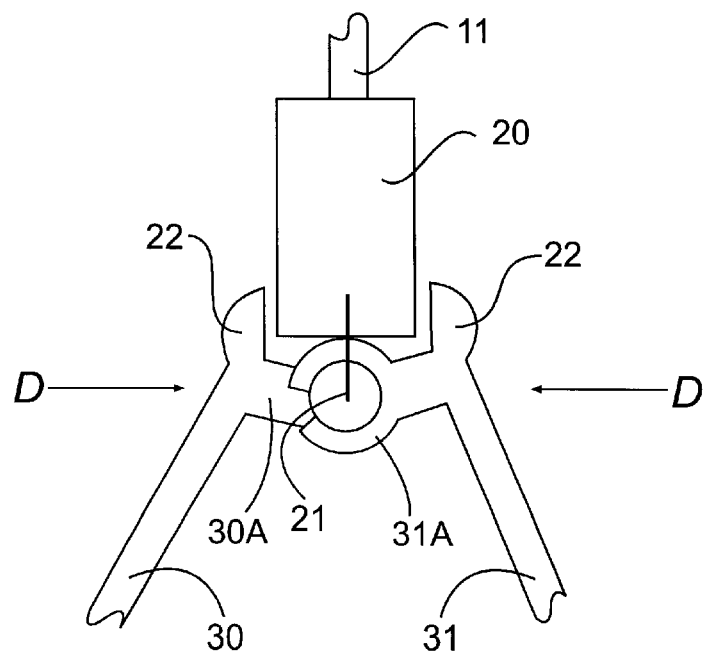

FIG. 5 is a sectional end view as indicated B—B in FIG. 3. This view shows the subject in the open position with end hanger 11 extending upward from the central body 20. Extending down from the central body is pivotal member 21 as depicted in FIGS. 5 and 5-A. The pivotal member allows the base legs 30 and 31 to open and close along this axis. FIG. 5 shows a positive stop 22 which is a part of the upper area of the base legs 30 and 31. FIG. 5-A is a sectional view of the subject in the open position as indicated D—D in FIG. 5. FIG. 5-A shows a close up view of the central pivotal area of the apparatus. End hanger 11 extends upward from central body 20. Front base leg 30 and rear base leg 31 are attached to the central body 20 by pivotal member 21 with the hinges 30A and 31A respectively. In the top area of the base legs 30 and 31 is a positive stop 22. This positive stop 22 limits the travel of base legs 30 and 31. Thus, the positive stop 22 keeps the base legs 30 and 31 in an inverted V angular relationship. As shown in FIG. 5-A when the base legs are in the open position the positive stop 22 grips the central body 20 with a plier like hold. The opening support member 32 as shown in FIG. 6 provides the opposing force and maintains the grip provided by the positive stop 22. In this manner the central body 20 is maintained in a vertical position from the grip provided by the positive stop. Hence, the hangers 10 and 11 are held vertically when the subject is open.

Figure 8:
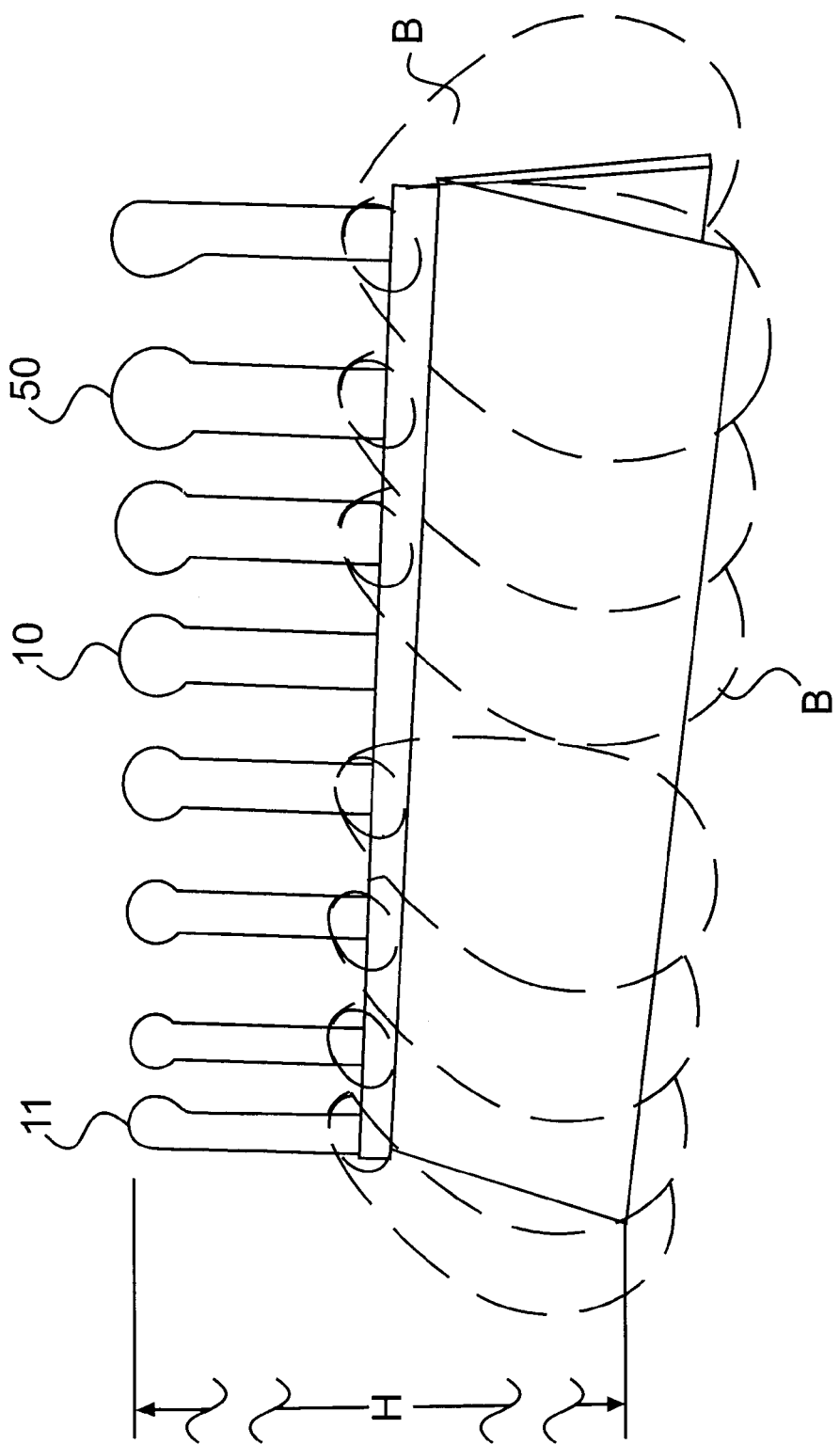
FIG. 8. is an overall perspective view of the subject apparatus being opened and in use.

FIG. 8 shows the apparatus 50 supporting a plurality of bags B. Additional room is available for even more bags to be suspended along the hangers 10 and 11. The height H of the apparatus can be made higher to support more and larger bags.

The operation of the subject is accomplished by taking the apparatus from the flat closed position as seen in FIG. 7 and spreading apart the base legs 30 and 31 as seen in FIG. 6. As seen in FIG. 6. the base legs 30 and 31 are held open with opening support member tab 32 which is pushed up from its hinged position on rear base leg 31. The securing standoff 34 holds the opening support tab 32 in place. The subject invention 50 can then be set in an upright position as shown in FIG. 8. From this open and ready position the subject can be loaded with bags. As shown in FIG. 8 the loop handles of the bags are placed over the hangers 10 and 11. The subject design allows for more than one bag to be supported from each hanger increasing the utility of the apparatus. The bags are supported on the same site area surface on which the base legs are placed. In this manner the bags provide an anchorage for the subject apparatus. The subject is designed so that it holds together the handles of the bags which in turn prevents the contents from spilling out of the bags. Upon reaching the destination the operator simply takes the loop handles of the bags and removes the bags up and off of the invention. The subject is then returned to its flat configuration for storage.

The apparatus is designed to stabilize a plurality of bags equipped with loop handles which contain diverse articles. The invention meets the objectives for its purpose providing an apparatus which stabilizes bags in transit, prevents the spillage of the contents and is simple to use.

The disclosure is made herein by the drawing FIGS. 1 through 8 and as illustrated are the preferred embodiments of the subject apparatus. The present invention and its working parts can be constructed from suitable rigid or semi-rigid materials. It is not the intent to limit the spirit nor scope of the subject apparatus by the narrative and drawings in this provisional application.

We claim:

1. A bag holder apparatus designed to stabilize bags containing articles comprising:
   a) a plurality of hangers that are configured to releasably receive and secure the bags, wherein at least one of said hangers extends from a central body;
   b) front and rear base members pivotally connected to said central body, said base members being capable of pivoting about a horizontal axis defined by said central body; and
   c) a hinged tab member capable of holding said base members in an operational configuration and allowing said base members to be collapsed into a non-operational configuration.

2. The apparatus of claim 1, wherein at least a portion of said hangers have an elongated "U" shape.

3. The apparatus of claim 1, wherein at least a portion of said hangers terminate in a rounded bulbous shape.

4. The apparatus of claim 1, wherein at least one of said base members contains a positive stop that engages said central body when said base members are in said operational configuration.

5. The apparatus of claim 1, wherein one of said base members contains said tab member and the other of said base members defines at least one standoff that releasably receives said tab member when said base members are in said operational configuration.

6. The apparatus of claim 1, wherein said base members and said central body are connected to a pivotal member.

7. A bag holder apparatus designed to stabilize bags containing articles comprising:

a) a plurality of hangers that are configured to releasably receive and secure the bags, wherein said plurality of hangers extend from a central body;
b) a pivotal member connected to said central body;
c) front and rear base members connected to said pivotal member so that said base members are capable of pivoting about a horizontal axis defined by said central body; and
d) a hinged tab member capable of holding said base members in an operational configuration and allowing said base members to be collapsed into a non-operational configuration.

8. The apparatus of claim 7, wherein at least a portion of said hangers have an elongated "U" shape.

9. The apparatus of claim 7, wherein at least a portion of said hangers terminate in a rounded bulbous shape.

10. The apparatus of claim 7, wherein at least one of said base members contains a positive stop that engages said central body when said base members are in said operational configuration.

11. The apparatus of claim 7, wherein one of said base members contains said tab member and the other of said base members defines at least one standoff that releasably receives said tab member when said base members are in said operational configuration.

12. A bag holder apparatus designed to stabilize bags containing articles comprising:
   a) a plurality of hangers that are configured to releasably receive and secure the bags, said plurality of hangers extending from a central body;
   b) front and rear base members operatively connected to said central body so that said base members are capable of pivoting about a horizontal axis defined by said central body; and
   c) a hinged tab member disposed on one of said base members, said hinged tab member being capable of holding said base members in an operational configuration and allowing said base members to be collapsed into a non-operational configuration, wherein the other of said base members defines at least one standoff that releasably receives said tab member when said base members are in said operational configuration.

13. The apparatus of claim 12, wherein said base members and said central body are connected to a pivotal member.

14. The apparatus of claim 12, wherein at least one of said base members contains a positive stop that engages said central body when said base members are in said operational configuration.

* * * * *